(12) United States Patent
Linton

(10) Patent No.: US 9,664,261 B1
(45) Date of Patent: May 30, 2017

(54) PLANETARY DIFFERENTIAL CVT WITH ANTI-FREEWHEEL ONE WAY CLUTCH

(71) Applicant: Schaeffler Technologies AG & Co. KG, Herzogenaurach (DE)

(72) Inventor: Daniel Linton, North Canton, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/189,484

(22) Filed: Jun. 22, 2016

(51) Int. Cl.
- *F16H 3/72* (2006.01)
- *F16H 48/10* (2012.01)
- *F16H 3/00* (2006.01)

(52) U.S. Cl.
CPC ............. *F16H 3/724* (2013.01); *F16H 3/006* (2013.01); *F16H 48/10* (2013.01); *F16H 2003/007* (2013.01)

(58) Field of Classification Search
CPC .......... F16H 3/724; F16H 48/10; F16H 3/006; F16H 2003/007
See application file for complete search history.

(56) References Cited

U.S. PATENT DOCUMENTS

| | | | |
|---|---|---|---|
| 1,690,189 A * | 11/1928 | Dennison | F16H 48/10 475/250 |
| 1,858,506 A | 5/1932 | Jacobs | |
| 5,409,425 A | 4/1995 | Shibahata | |
| 5,419,406 A | 5/1995 | Kawamoto et al. | |
| 5,437,583 A | 8/1995 | Shibahata et al. | |
| 5,518,463 A | 5/1996 | Shibahata et al. | |
| 5,976,051 A * | 11/1999 | Madsack | F16H 48/285 475/249 |
| 7,588,511 B2 | 9/2009 | Tangl et al. | |
| 8,012,057 B2 | 9/2011 | Meixner | |
| 8,430,779 B2 | 4/2013 | Hoehn | |
| 8,480,532 B2 * | 7/2013 | Biermann | F16H 48/10 475/252 |
| 9,133,925 B2 * | 9/2015 | Honda | B60K 6/445 |
| 2008/0169166 A1 | 7/2008 | Wittkopp et al. | |
| 2011/0281684 A1 * | 11/2011 | Ushiroda | B60K 1/02 475/331 |

(Continued)

FOREIGN PATENT DOCUMENTS

| | | |
|---|---|---|
| DE | 102005021023 | 11/2006 |
| DE | 1029008061945 | 6/2010 |

(Continued)

*Primary Examiner* — David J Hlavka
(74) *Attorney, Agent, or Firm* — Volpe and Koenig, P.C.

(57) ABSTRACT

A planetary differential continuously variable transmission is provided having a first drive input ring gear having internal teeth, and a planetary differential connected to the first drive input ring gear, A first electric machine is provided having a first stator and a first rotor, with the first rotor being connected to the first drive ring input ring gear. A second electric machine is provided having a second stator and a second rotor, with the second rotor being connected to the planet gear carrier of the planetary differential and acts as a second drive input. A one way clutch is located between the second stator and the second rotor to limit a reverse rotation of the second rotor in order to improve efficiency and save battery life in electric or hybrid vehicles with this drive system.

11 Claims, 4 Drawing Sheets

(56) References Cited

U.S. PATENT DOCUMENTS

| | | | | |
|---|---|---|---|---|
| 2013/0296088 | A1* | 11/2013 | Savage | B60K 6/365 |
| | | | | 475/5 |
| 2014/0309073 | A1* | 10/2014 | Martini | F16H 48/11 |
| | | | | 475/220 |
| 2014/0329634 | A1* | 11/2014 | Biermann | F16H 48/11 |
| | | | | 475/220 |
| 2015/0057122 | A1 | 2/2015 | Smetana | |

FOREIGN PATENT DOCUMENTS

| | | |
|---|---|---|
| DE | 102009028384 | 2/2011 |
| DE | 102013214095 | 1/2015 |
| JP | 2007177915 | 7/2007 |
| WO | 2010066532 | 6/2010 |

* cited by examiner

PLANETARY DIFFERENTIAL CVT WITH ANTI-FREEWHEEL ONE WAY CLUTCH

FIELD OF THE INVENTION

The present invention is related to the field of drive trains for motor vehicles, and in particular to continuously variable transmissions and differential.

BACKGROUND

Motor vehicles typically include a drive train with a primary drive, such as an internal combustion engine, which is paired with a transmission in order to provide different gear drive ratios from the engine to the drive wheels. Typically, the transmission is connected to a differential which transmits torque from the transmission to output axles, with the differential compensating for different rotational speeds of wheels attached to the output axles which occurs, for example, during turning. Various transmissions are known including manual transmissions which include a vehicle operator activated clutch and a shifter which the vehicle operator uses to engage different gears, automatic transmissions which include internal clutches and speed sensors for automatic shifting between gears, double clutch standard transmissions which are electronically shifted based on various operating conditions, as well as continuously variable transmissions (CVTs) which offer a continuously variable torque ratio over a wide range of drive ratios without the need for separate gearing being engaged or disengaged as is required in the manual, automatic, and double clutch transmissions.

Differentials are also known in the form of both spur gear differentials and bevel gear differentials. Spur gear differentials provide an advantage in that the axial length of the differential in a direction of the output axes is drastically reduced in comparison to a bevel gear differential. Spur gear differentials utilize spur gears connected to a planetary gear carrier that itself is driven by the transmission output and drives the output axles via sun gears that engage the planetary gears. Here a first set of planet gears is associated with the first sun and a second set of planet gears is associated with the second sun, with the first and second planet gears also intermeshing via the first set of planet gears axially overlapping and engaging the second set of planet gears. The number of teeth of the planet gears of both sets is equal and the number of teeth of the first and second sun gears is also equal. Generally, the teeth of the first sun gear are arranged on a crown circle with a crown circle diameter that is different than the crown circle diameter of the crown circle on which the teeth of the second sun are arranged so that the first set of planet gears meshes with only the first sun and the second set of planet gears meshes only with the second sun. Such a spur gear differential is known from U.S. Pat. No. 8,480,532, which is owned by the assignee of the present invention and is incorporated herein by reference as if fully set forth.

Bevel gear differentials also include a carrier in which a pair of drive bevel gears are mounted that engage with a pair of driven bevel gears having a common axis that is arranged perpendicular to the common axis of the drive bevel gears. The driven bevel gears are connected to the output axels.

The inventor's prior U.S. application Ser. No. 14/923,886, filed Oct. 27, 2015, which is incorporated herein by reference as if fully set forth discusses a CVT differential that provides for reduced weight and the elimination of the need for a separate transmission in vehicles, and is particularly adaptable for hybrid motor vehicles.

For hybrid motor vehicles where a primary drive is provided, generally in a form of an internal combustion engine, and a secondary drive is provided, typically in the form of an electric motor driven via on board batteries in the motor vehicle, as well as for all electric vehicles that are only driven by electric motor(s), there is a continuing challenge to optimize the electric drive to conserve battery life and extend the vehicle drive range.

SUMMARY

A planetary differential continuously variable transmission is provided having a first drive input ring gear having internal teeth, and a planetary differential connected to the first drive input ring gear, with the planetary differential including a planet gear carrier, first planet gears, second planet gears, a first sun gear, and a second sun gear. The teeth of the first planet gears are engaged by the internal teeth of the first drive input ring gear and engage teeth of the first sun gear, the teeth of each of the first planet gears also engage teeth of corresponding ones of the second planet gears, and the teeth of the second planet gears engage teeth of the second sun gear. A first electric machine is provided having a first stator and a first rotor, with the first rotor being connected to the first drive ring input ring gear. A second electric machine is provided having a second stator and a second rotor, with the second rotor being connected to the planet gear carrier that acts as a second drive input. A one way clutch is located between the second stator and the second rotor to limit a reverse rotation of the second rotor.

Such an arrangement has application in electric and hybrid motor vehicles in order to provide a light weight and compact drive system. In this case, the second electric machine acts as an optimization drive to optimize the power being consumed for a particular driving condition by operating both the first and second electric machines in a range of the torque curve that minimizes current draw for the particular operating speed. This arrangement eliminates the need to apply energy from a battery or other power supply to the second electric machine to prevent reverse rotation when only the first electric machine is required for a particular power output requirement, such as low speed operation of a hybrid or electric motor vehicle, resulting in a significant savings in battery life.

In one arrangement, at least one of the first and second electric machines is a motor generator which can be used to recharge a battery or other energy accumulator.

In one arrangement, the second electric machine is connected to a controller configured to energize the second electric machine in a manner to optimize a power consumption of the first electric machine and the second electric machine for a power output condition for the transmission.

In a preferred arrangement, the one way clutch is a sprag clutch, a roller clutch, or a rocker clutch.

Preferably, first and second output shafts are connected to the first and second sun gears, respectively. These can then be connected to drive wheels of an electric or hybrid motor vehicle. The first electric machine is preferably reversible to reverse a rotation direction of the output shafts In a preferred arrangement, the first and second electric machines are arranged concentrically around the output shafts.

In another aspect, an electric or hybrid vehicle is provided including a planetary differential continuously variable transmission including one or more of the features noted above. Here, a power source connected to the first and second electric machines, and wheels are connected to the output shafts. A controller is provided that is configured to energize the second electric machine in a manner to optimize a power consumption of the first electric machine and the second electric machine for a power output condition required to achieve a desired driving speed.

BRIEF DESCRIPTION OF THE DRAWINGS

The foregoing Summary as well as the following Detailed Description will be best understood when read in conjunction with the appended drawings which show a preferred embodiment of the invention. In the drawings.

DETAILED DESCRIPTION OF THE PREFERRED EMBODIMENTS

Figure 1:
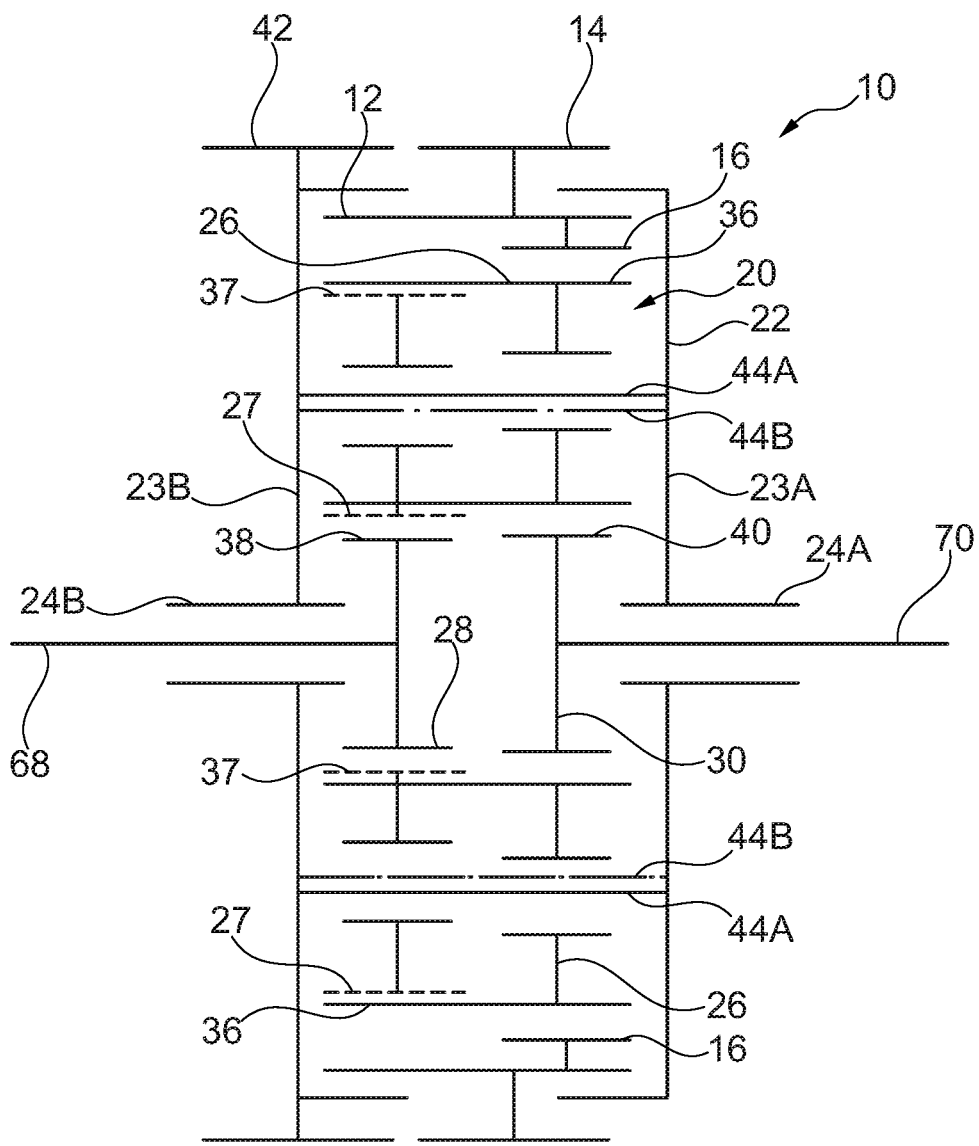
FIG. 1 is a schematic view, in cross section, of a CVT differential.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. These terms and terms of similar import are for ease of description when referring to the drawings and should not be considered limiting. "Axially" refers to a direction along the axis of a shaft or similar object. A reference to a list of items that are cited as "at least one of a, b, or c" (where a, b, and c represent the items being listed) means any single one of the items a, b, or c, or combinations thereof.

For elements of the invention that are identical or have identical actions, identical reference symbols are used. The illustrated embodiments represent merely examples for how the device according to the invention could be equipped. They do not represent a conclusive limitation of the invention.

Referring now to FIG. 1, first embodiment of a planetary differential continuously variable transmission (CVT) 10 ("transmission 10") is schematically illustrated. The transmission 10 includes a first drive input ring gear 12 having internal teeth 16. These are shown in detail FIGS. 2 and 3. The first drive input ring gear 12 is mounted for rotation via bearings, which are not illustrated in further detail, and connected to an input drive rotor 14.

Figure 2:
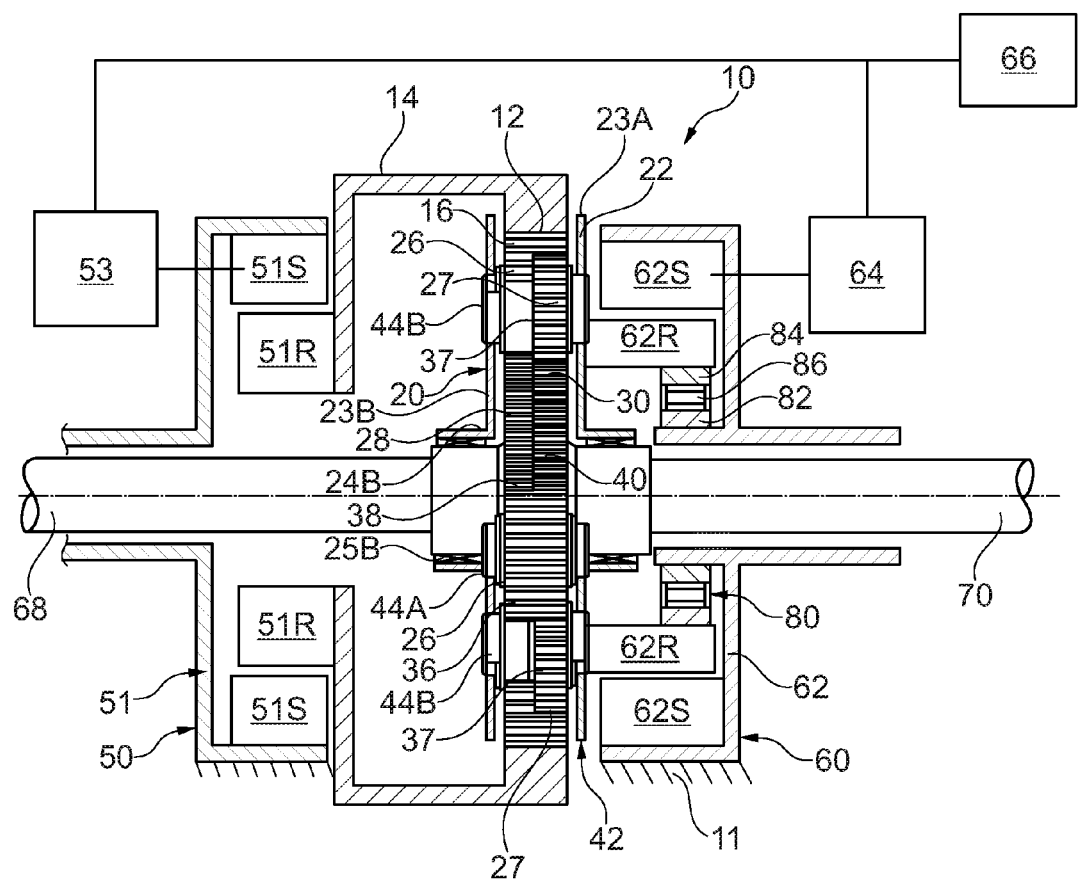
FIG. 2 is a cross-sectional view through a portion of the CVT differential shown in FIG. 1 shown in connection with primary and secondary electrical machine drives and illustrating the first drive input ring gear driven by a primary electric machine drive as well as the planetary spur gears connected to a carrier and engaging sun gears that drive two output shafts, as well as a second drive input connected to the planet carrier driven by a secondary electrical machine drive.
Figure 3:
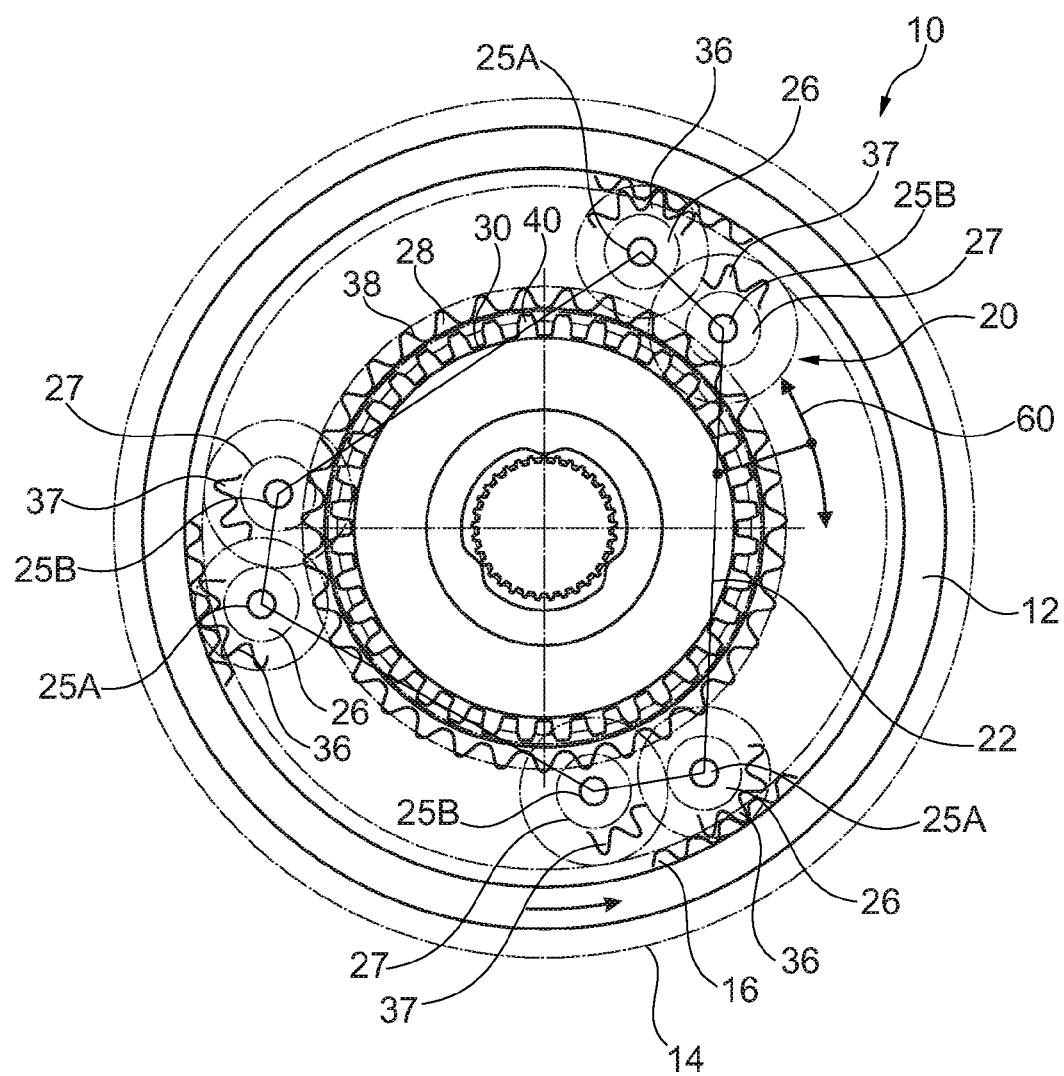
FIG. 3 is an end view, partially in schematic form, showing the arrangement of the CVT differential in FIG. 2.

A planetary differential 20 is connected to the first drive input ring gear 12. The planet differential 20 includes a planet gear carrier 22, first planet gears 26, second planet gears 27, a first sun gear 28, and a second sun gear 30. The planet gear carrier 22 is shown in this embodiment as being formed by carrier plates 23*a*, 23*b*, that have flanges 24*a*, 24*b*, preferably supported via bearings 25*a*, 25*b*, as shown in FIG. 2 and FIG. 3. Planet pins 44*a*, 44*b* are used to mount the first planet gears 26 and second planet gears 27 to the planet gear carrier 22, as shown in detail in FIG. 2 and represented schematically in FIG. 1, the first planet gears 26 include teeth 36 that are engaged by the internal teeth 16 of the first drive input ring gear 12 and also engage teeth 38, of the first sun gear 28. The teeth 36 of each of the first planet gears 26 also engage teeth 37 of corresponding ones of the second planet gears 27 due to the axial overlap of the first planet gears 26 with the second planet gears 27 as shown in detail in FIG. 2. The teeth 37 and the second planet gears 27 engage teeth 40 and the second sun gear 30. This is also shown in detail in FIGS. 2 and 3. As shown in detail in FIG. 3, the teeth 36 of the first planet gear 26 have a crown circle which does not overlap the crown circle of the teeth 40 of the second sun gear 30.

As shown in FIG. 2, a primary drive 50 in the form of an electric machine 51 is provided. This first electric machine 51, which can preferably be operated as an electric motor as well as a generator, includes a rotor 51R that is fixed to the first drive input ring gear 12 via the input drive rotor 14. The stator 51S of the first electric machine 51 is connected to the chassis or frame 11 of the vehicle. The first electric machine 51 is preferably a reversible, brushless motor.

A second drive input 42 is connected to the planet gear carrier 22 thereby allowing the planet gear carrier to be both an input from a power source as well as an integral part of the planetary set. A secondary drive 60 is connected to the second drive input 42. This secondary drive 60 comprises a second electric machine 62 having a rotor 62R that is fixed to the carrier 22 for the first and second sets of planet gears 26, 27. The second electric machine 62 further includes a stator 62S which is mounted to the chassis or frame, represented as 11. The second electric machine 62 is preferably a brushless motor. Preferably, the first electric machine and the second electric machine 62 are concentric to the output shafts or axles 68, 70 which are connected to the sun gears 28, 30, respectively.

Figure 4:
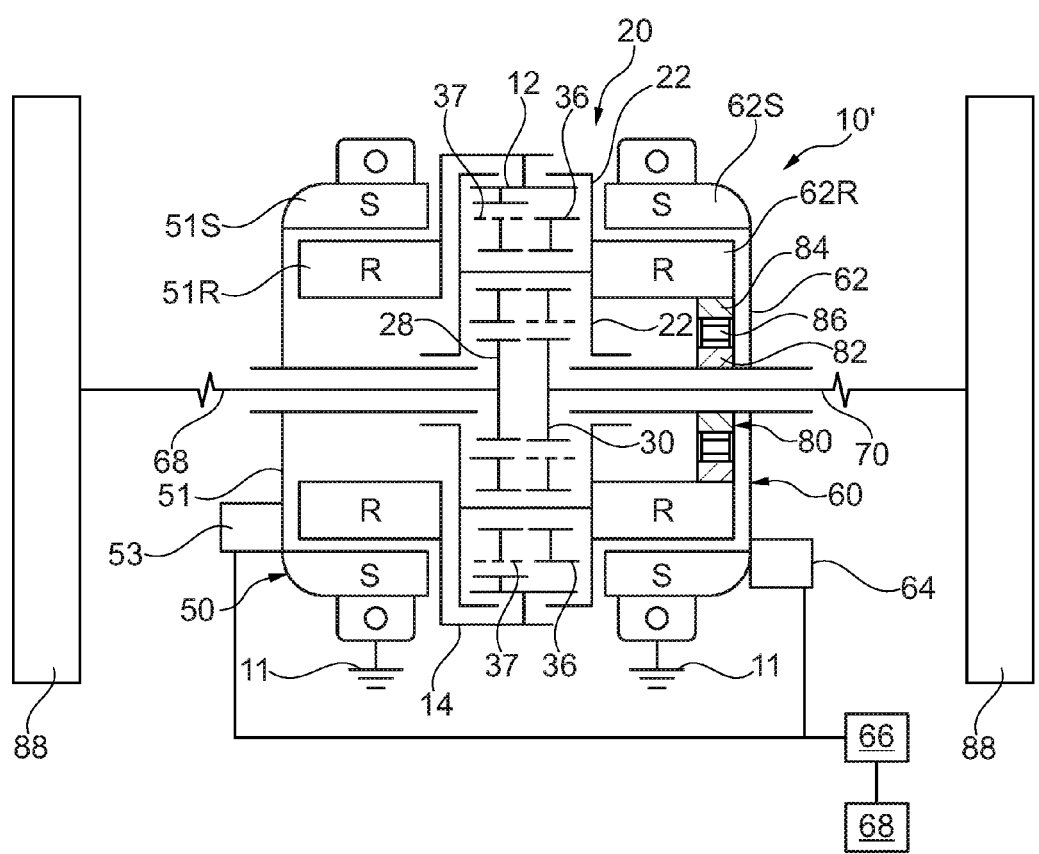
FIG. 4 is a schematic view of the CVT differential of FIGS. 1-3 in an electric or hybrid motor vehicle.

As shown in FIGS. 2 and 4, a one-way clutch 80 is connected between the second stator 62S and the second rotor 62R to limit a reverse rotation of the second rotor 62R, particularly during operation in which only the first electric machine 51 is required for the vehicle operating conditions, such as low speed (which is generally defined as 45 mph or less, but could be other speeds depending on the particular vehicle, motors and gear ratios) or reverse operation. The one-way clutch 80 is preferably a sprag clutch, a roller clutch, or a rocker clutch, and includes a fixed inner ring 82, which can be connected to the vehicle 11 or a housing of the transmission 10, an outer ring 84 that is connected to the rotor 62R, and locking elements 86 located between the inner and outer rings 82, 84. The specific configuration of the inner and outer rings 82, 84 as well as the locking elements 86 are dependent on the type of one-way clutch (e.g., sprag, roller, or rocker) and are known to those of ordinary skill in the art, so a detailed description of the various types of one-way clutches is not provided here. The one-way clutch 80 eliminates the need to separately power the second electric machine 62 during operating conditions when no power input from the second electric machine 62 is required into the planetary differential 20 for the particular vehicle operating condition in order to prevent reverse rotation which results in not all of the input from the first electric machine 51 from being transmitted to the output shafts 68, 70, thus conserving battery power and increasing efficiency which translates into a greater vehicle operating range.

Still with reference to FIG. 2, a first motor controller 53 is provided for the first electric machine 51 and a second motor controller 64 is provided for the second electric machine 62 in order to control an output ratio of the transmission 10. The first and second motor controllers 53, 64 are used in order to vary at least one of a speed or a direction of rotation of the first and second sun gears 28, 30. The first electric machine 51 is preferably a reversible motor can provide a reverse drive for the output shafts 68, 70, which are preferably connected to wheels 88 of the vehicle 11, shown schematically in FIG. 4. The first electric machine 51 also provides the primary forward drive for the vehicle 11. By varying the speed of the second electric machine 62, higher or lower output ratios for the output shaft 68, 70 can be achieved, preferably while maintaining an optimal efficiency range for the first electric machine 51 and preferably for both electric machines 51 and 62 under optimal vehicle speed ranges (typically—but not limited to—speeds above 45 mph) according to designed transmission output ratios.

Preferably, a vehicle controller 66 controls or is combined with the first and second motor controllers 53, 64, and provides power from a power source, such as a battery or battery pack 68, to the first and second electric machines 51, 62. The vehicle controller 66 is configured to energize the second electric machine 62 in a manner to optimize a power consumption of the first electric machine 51 and the second electric machine 62 for a desired output condition for the transmission 10, such as an operator selected speed, which can be input to the vehicle controller 66, for example through a foot pedal signal that signals an increase or decrease in a desired vehicle speed. The vehicle controller 66 is preferably a programmable controller or a computer having a programmable memory that stores the operating parameters for the electric machines 51, 62 and is programmed to optimize a power output from each of the first and second electric machines 51, 62 in order to minimize a power draw from a battery by the first and second electric machines 51, 62 by operating in the most efficient area of the torque-power curve for each of the first and second electric machines 51, 62 for the vehicle operating condition.

Preferably, one of the first or second electric machines 51, 62 is a motor-generator and a Hall-effect sensor is provided in the electric machine 51, 62 or in the associated controller 53, 64 in order to sense a current flow and switch between a drive mode and a generator mode, depending upon inputs from the controller 53, 64 which can receive signals from the vehicle controller 66 that provides various operating parameters as inputs for drive or regeneration to the electric machines 51, 62.

In the above embodiments, all the rotating parts would be supported via appropriate bearings or bushings and the arrangements would be encased in an outer casing to allow for lubrication. As these items are customary in the art, they have not been described in further detail.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

The invention claimed is:

1. A planetary differential continuously variable transmission, comprising:
   a first drive input ring gear having internal teeth;
   a planetary differential connected to the first drive input ring gear, the planetary differential including a planet gear carrier, first planet gears, second planet gears, a first sun gear, and a second sun gear, teeth of each of the first planet gears are engaged with the internal teeth of the first drive input ring gear and the teeth of each of the first planet gears engage teeth of the first sun gear, and the teeth of each of the first planet gears also engage teeth of corresponding ones of each of the second planet gears, and the teeth of each of the second planet gears engage teeth of the second sun gear;
   a first electric machine having a first stator and a first rotor, the first rotor is connected to the first drive ring input ring gear;
   a second electric machine having a second stator and a second rotor, the second rotor is connected to the planet gear carrier that acts as a second drive input; and
   a one way clutch located between the second stator and the second rotor to limit a reverse rotation of the second rotor.

2. The transmission of claim 1, wherein at least one of the first and second electric machines is a motor generator.

3. The transmission of claim 1, wherein the second electric machine is connected to a controller configured to energize the second electric machine in a manner to optimize a power consumption of the first electric machine and the second electric machine for a power output condition for the transmission.

4. The transmission as claimed in claim 1, wherein the one way clutch is a sprag clutch.

5. The transmission as claimed in claim 1, wherein the one way clutch is a roller clutch.

6. The transmission as claimed in claim 1, wherein the one way clutch is a rocker clutch.

7. The transmission as claimed in claim 1, wherein first and second output shafts are connected to the first and second sun gears, respectively.

8. The transmission as claimed in claim 1, wherein the first and second electric machines are arranged concentrically around the output shafts.

9. The transmission as claimed in claim 1, wherein the first electric machine is reversible to reverse a rotation direction of the output shafts.

10. An electric vehicle comprising:
    a planetary differential continuously variable transmission, including
    a first drive input ring gear having internal teeth;
    a planetary differential connected to the first drive input ring gear, the planetary differential including a planet gear carrier, first planet gears, second planet gears, a first sun gear, and a second sun gear, teeth of each of the first planet gears are engaged with the internal teeth of the first drive input ring gear and the teeth of each of the first planet gears engage teeth of the first sun gear, and the teeth of each of the first planet gears also engage teeth of corresponding ones of each of the second planet gears, and the teeth of each of the second planet gears engage teeth of the second sun gear;

a first electric machine having a first stator and a first rotor, the first rotor is connected to the first drive ring input ring gear;

a second electric machine having a second stator and a second rotor, the second rotor is connected to the planet gear carrier that acts as a second drive input;

a one way clutch located between the second stator and the second rotor to limit a reverse rotation of the second rotor;

a power source connected to the first and second electric machines;

wheels connected to the output shafts; and a controller configured to energize the second electric machine in a manner to optimize a power consumption of the first electric machine and the second electric machine for a power output condition required to achieve a desired driving speed.

11. A hybrid vehicle comprising:

a planetary differential continuously variable transmission, including a first drive input ring gear having internal teeth;

a planetary differential connected to the first drive input ring gear, the planetary differential including a planet gear carrier, first planet gears, second planet gears, a first sun gear, and a second sun gear, teeth of each of the first planet gears are engaged with the internal teeth of the first drive input ring gear and the teeth of each of the first planet gears engage teeth of the first sun gear, and the teeth of each of the first planet gears also engage teeth of corresponding ones of each of the second planet gears, and the teeth of each of the second planet gears engage teeth of the second sun gear;

a first electric machine having a first stator and a first rotor, the first rotor is connected to the first drive ring input ring gear;

a second electric machine having a second stator and a second rotor, the second rotor is connected to the planet gear carrier that acts as a second drive input;

a one way clutch located between the second stator and the second rotor to limit a reverse rotation of the second rotor;

a power source connected to the first and second electric machines;

wheels connected to the output shafts; and a controller configured to energize the second electric machine in a manner to optimize a power consumption of the first electric machine and the second electric machine for a power output condition required to achieve a desired driving speed.

* * * * *